Jan. 7, 1969 H. E. BENNETT ET AL 3,421,079
MEASURING THIN FILM THICKNESS USING INTERFEROMETRIC-CAPACITANCE
TECHNIQUE
Filed April 26, 1966

$$t = \frac{n}{2}\Delta\lambda \quad n = \frac{\lambda_2 \Delta n}{\lambda_1 - \lambda_2}$$

INVENTORS.
HAROLD E. BENNETT
JEAN M. BENNETT
EDMOND J. ASHLEY
BY
JOHN M. KOCH
ROY MILLER
ATTORNEYS.

United States Patent Office 3,421,079
Patented Jan. 7, 1969

3,421,079
MEASURING THIN FILM THICKNESS USING
INTERFEROMETRIC-CAPACITANCE TECHNIQUE
Harold E. Bennett, Jean M. Bennett and Edmond J.
Ashley, China Lake, Calif., assignors to the United
States of America as represented by the Secretary
of the Navy
Filed Apr. 26, 1966, Ser. No. 546,154
U.S. Cl. 324—61                                   7 Claims
Int. Cl. G01r 27/26; G01n 21/00; G01j 3/00

ABSTRACT OF THE DISCLOSURE

A method for measuring thin film thicknesses of metal or semiconductor oxide films, such as those which form spontaneously on metals in air or a similar atmosphere using an interferometric-capacitance technique.

---

The invention described herein may be manufactured and used by or for the Government of the United States of America for governmental purposes without the payment of any royalties thereon or therefor.

The effect of thin, naturally-occurring oxide films on the optical properties of metals and semiconductors becomes increasingly important as one goes to shorter wavelengths in the ultraviolet and vacuum ultraviolet. The decrease in reflectance caused by these films is presumably calculable if they are isotropic and their complex refractive indices and thicknesses are known. However, although their refractive indices may be reasonably well-known, their thicknesses are typically under about 40 A. For this reason it is very difficult to obtain accurate values of film thickness using any optical technique unless the optical constants of the substrate are known first. If films widely differing in thickness can be formed on identical substrates, immersion ellipsometry may be employed to determine the optical properties of the films and substrates. Otherwise, techniques such as ellipsometry and interferometry can be used to accurately determine changes in film thickness, but not in general the total film thickness.

Capacitance measurements may also be used to determine the thickness of a sufficiently thick dielectric film on a metal substrate. If the film-covered metal substrate is brought into intimate contact with another conducting medium, a capacitor is formed whose capacitance is, to a good approximation, inversely proportional to the total film thickness. The capacitance method has frequently been used in semiconductor research on anodized films of various thicknesses, but a critical comparison of the thickness values obtained from capacitance measurements with those obtained using optical techniques has apparently not been made. There are several basic limitations to the simple capacitance method. Most serious is that the method cannot be used for measuring the thickness of extremely thin films because tunnelling and dielectric breakdown occur even for very small applied voltages. The capacitance method is thus applicable only if the thickness of the surface film is greater than about 40 A.

One thus has the problem of measuring the thickness of surface films which are usually thinner than 40 A., and has available two techniques for measuring film thickness, neither of which can be used for films thinner than about 40 A.

Accordingly, it is a principal object of this invention to provide a method for measuring the thickness of surface films of dielectric materials, particularly those thinner than 40 A., upon metal or semiconductor materials.

Another object of this invention is to provide a method for measuring the thickness of metal oxide films which form naturally in air atmospheres.

Additional objects of this invention will become apparent from the following description, which is given primarily for purposes of illustration and not limitation.

Stated in general terms, the objects of the invention are attained by providing a method of film thickness determination which involves the deposition of a film having known dielectric properties upon the thin film, the thickness of which is to be determined, so that the resultant composite film thickness is sufficiently great to be measured directly by making a capacitance measurement. The thickness of the deposited film is then measured directly by making a multiple beam interferometry measurement. The thickness of the thin film sought after is then determined by subtracting the thickness of the deposited film measured by interferometry from the thickness of the composite film measured by capacitance.

A more detailed description of a specific embodiment of the invention is given below with reference to the accompanying drawing wherein.

The accuracy of interformetric measurements of film thickness has been carefully investigated by W. F. Koehler and A. Eberstein (J. Opt. Soc. Am. 43, 747 (1953)) and Jean M. Bennett (J. Opt. Soc. Am. 54, 612 (1964)), and may be regarded as established provided that careful experimental techniques are used. However, the accuracy of the capacitance method is not so well established and requires some discussion. Consider first the theoretical basis for the method. From elementary electro-magnetic theory, the capacitance per unit area of a dielectric mounted between two perfectly conducting plates is given in mks. units by Equation 1.

$$C = \frac{\epsilon \kappa_0}{t} \quad (1)$$

where $t$ is the thickness of the dielectric slab, $\epsilon$ its dielectric constant, and $\kappa_0$ the permittivity of free space. Ideally, then, the measured capacitance is inversely proportional to film thickness. In practice, a correction must be applied to Equation 1 since actual metals are not perfect conductors and hence there will be some penetration of the electric field into the metal. The resultant capacitance of the metal-thin film system may be represented by two capacitors in series, one containing the dielectric, and one associated with the field penetration into the metal. For semiconductors this latter contribution can be appreciable, but for good conductors such as aluminum and the noble metals the added capacitance is equivalent to that of an air capacitor with a thickness of only about 1 A. The exact expression for the capacitance of a condenser with plates 1 mm.$^2$ in area is given by Equation 2.

$$t \, (A.) = 88.54\epsilon \left( \frac{1}{C(nf)} - \frac{1}{77} \right) \quad (2)$$

Within the experimental uncertainty of the measurements, then, the total film thickness is inversely proportional to the measured capacitance. Hence, if the thickness of the added evaporated film is plotted versus the reciprocal of the measured capacitance, the graph will be a straight line, whose $x$ intercept will give the thickness of the naturally-occurring surface film.

In an actual example, evaporated films were deposited onto 1½ inch diameter glass blanks mounted in a turntable arrangement to minimize possible thickness nonuniformities produced during evaporation. A coating distance of 21 inches and filament or electron gun sources were used. Vacuums during deposition were about $10^{-5}$ torr. After depositing gold leads on the glass blank, the aluminum metal to be investigated was deposited on the glass blank and allowed to oxidize in air. A thin, natural dielectric film of aluminum oxide, the thickness of which it was desired to measure by the method of the invention, was formed spontaneously in the air atmosphere.

Figure 1:
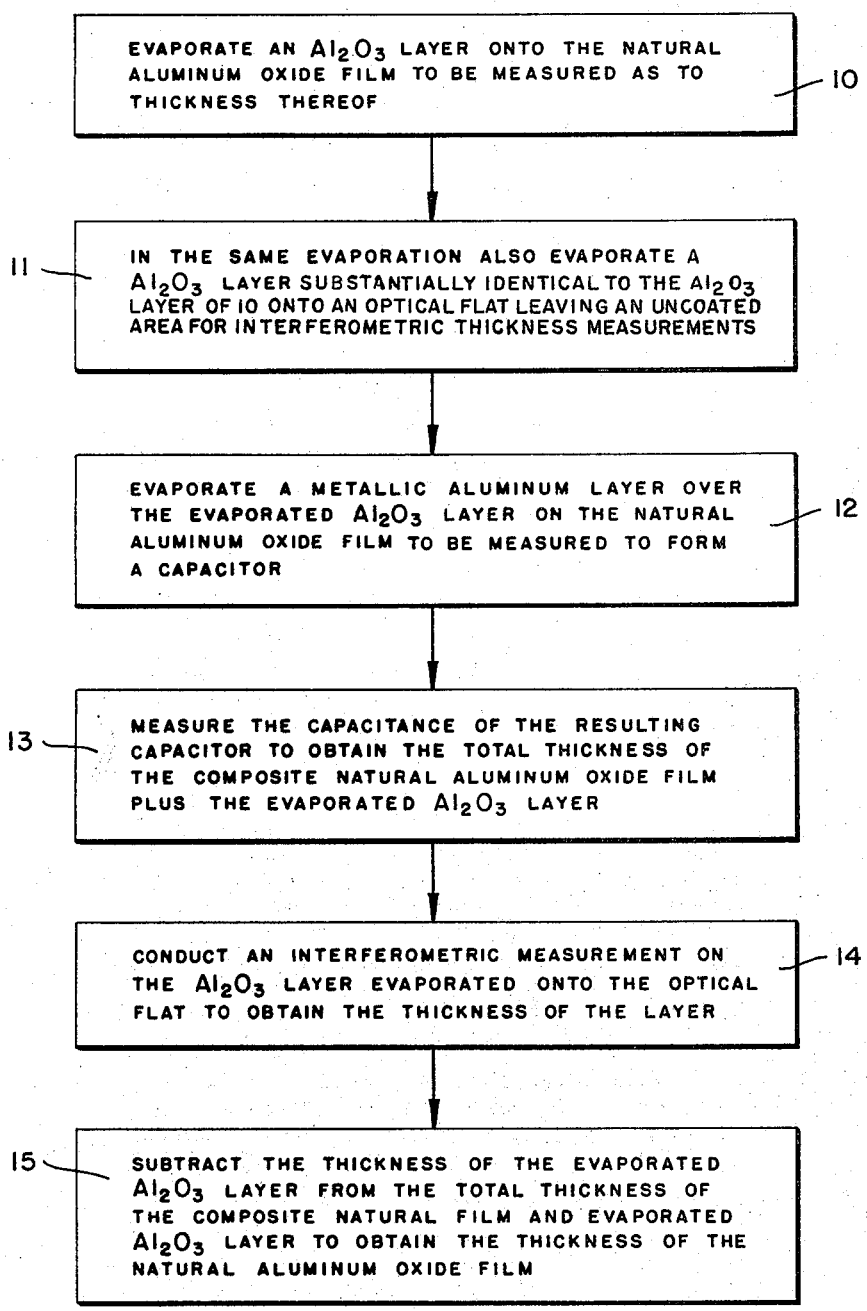
FIG. 1 is a flow sheet of the method of the invention as applied to determining the thickness of an aluminum oxide film formed spontaneously in air upon an aluminum surface.

Next a thin dielectric layer of aluminum oxide was deposited onto the natural aluminum oxide film, as indicated at 10 in the flow sheet of FIG. 1. In the same evaporation, a substantially identical layer of aluminum oxide was deposited onto an optical flat while leaving an uncoated area for interferometric thickness measurements, as indicated at 11 in the flow sheet of FIG. 1. To complete the capacitor structure, a top layer of aluminum metal was deposited onto the dielectric layer of aluminum oxide, previously was deposited onto the thin natural film of aluminum oxide. This step is indicated at 12 on the flow sheet of FIG. 1.

Figure 2:
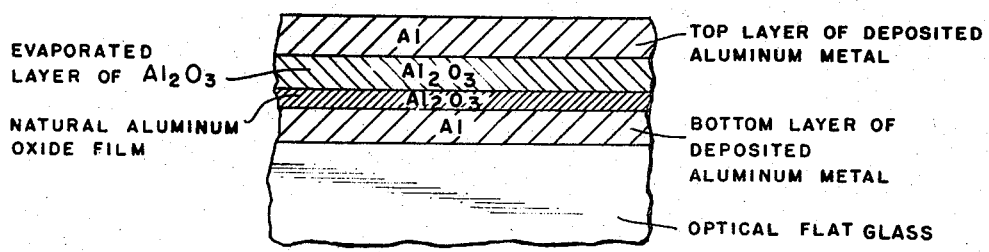
FIG. 2 is a schematic, partial vertical sectional view showing the capacitor structure as produced upon an optical flat.
Figure 3:
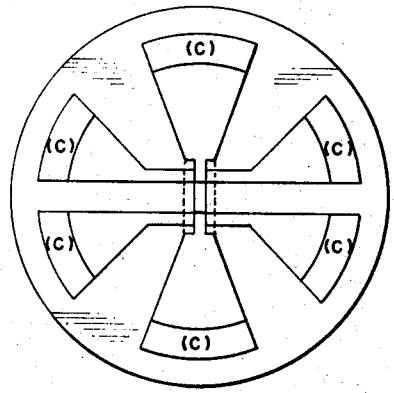
FIG. 3 is a schematic plan view showing the configuration of two capacitance samples prepared on an optical blank to make reproducible capacitance measurements.

The structure of the resulting capacitor on the optical flat is shown in FIG. 2. Two capacitance samples were prepared on each optical blank to check reproducibility. The actual configuration is shown in FIG. 3. After gold leads had been deposited onto the pie-shaped sections, the metal whose oxidation was to be studied was deposited over the part of the leads indicated by the diagonal shading and also over the narrow vertical strip joining them. After the metal had been allowed to oxidize, the aluminum oxide film was deposited over the slightly wider strip indicated by the dotted line. Finally, the top plate of the condenser was formed by depositing aluminum onto the coarsely crosshatched areas and then strips joining them. The area whose capacitance was to be determined, indicated by the finely crosshatched lines, was accurately 1 mm.$^2$. The areas of contact between the metal films and the gold leads, indicated by the large shaded and crosshatched areas, were as large as possible, about 15 mm.$^2$, to reduce the effect of lead capacitance. Contact was made to the exposed area of the gold films, indicated by (c), by means of a fixture containing spring-loaded bars tipped with indium. The lead capacitance could be measured by connecting the bridge between opposite ends of any deposited film section, and was typically about 0.5 µf. It sample measurements were being made, the two ends could be connected in parallel, increasing the total lead capacitance in series with the unknown to about 1 µf. It is desirable to make the lead capacitance as large as possible since the unknown and lead capacitors are in series, and hence the measured capacitance is determined by the sum of the reciprocals of the two capacitors. Since the capacitance of the sample was typically 1–10 nf., the error caused by the 1 µf. lead capacitance was less than 1%.

The capacitance measurements, indicated at 13 on the flow sheet of FIG. 1, were made on a General Radio type 1650 capacitance bridge operated with an external oscillator. Measurements could be made between 200 c.p.s. and 20 kc., although normally a frequency of 1 kc. was used. A particular advantage of this type of bridge is that the AC voltage applied to the sample is quite low, typically less than 2 mv. Dielectric breakdown of the thin dielectric layers was thus avoided in most cases. Both an oscilloscope and an electronic null detector were used to obtain the balance. Typical capacitance values were of the order of 1–10 nf. and could be determined with an uncertainty of about 2%. The uncertainty largely resulted from real differences between the two test samples on each glass blank. Reproducibility of measurements on a given sample was considerably better than 2%.

Figure 5:
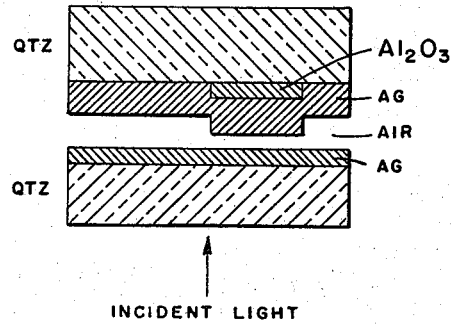
FIG. 5 is a schematic partial diagram showing the interferometer employed with the optical system of FIG. 4.
Figure 4:
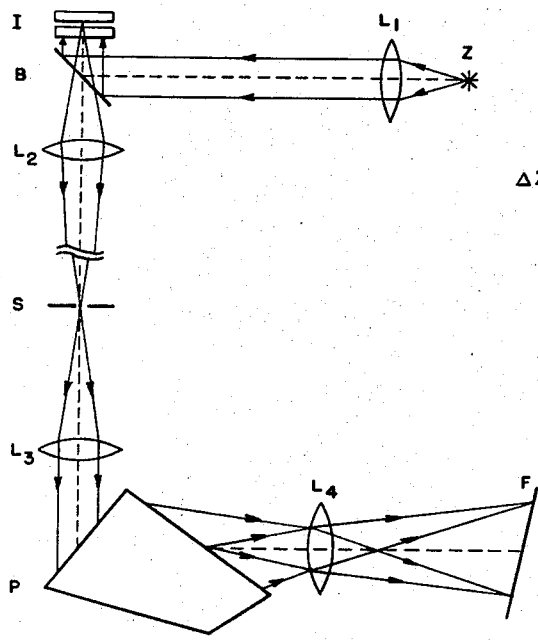
FIG. 4 is a schematic diagram showing the interferometer optical system used to make film thickness measurements.

The thickness of the added dielectric film was determined interferometrically, as indicated at 14 in FIG. 1. FIG. 4 schematically shows the interferometric system used. As mentioned hereinabove, and indicated at 11 in FIG. 1, an optical flat was coated in the same evaporation with the condenser, and a mask limited the film to a narrow strip across the center of the flat. The flat was then overcoated with an opaque layer of silver, and an interferometer was formed using a second partially silvered optical flat, as is shown in FIG. 5. Fringes of equal chromatic order were formed in reflection using a Vickers Projection Microscope and a Bausch and Lomb direct reading spectrograph.

Referring to the optical diagram shown in FIG. 4, light from a 100 watt zirconium arc Z is collimated by lens $L_1$, and is partially reflected to the interferometer I by beam splitter B. Lens $L_2$ collects the light reflected from the interferometer and focusses a magnified image of a small portion of the interferometer on the entrance slit S of the spectrograph. The spectrograph disperses the light, so that the spectrum of an 11 times magnified image of the interferometer is formed in the focal plane F. This spectrum may be observed visually or photographed.

Figure 6:
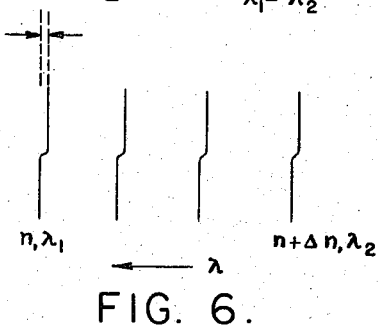
FIG. 6 is a schematic representation of a photograph of the spectrum obtained in making the interferometric film thickness measurements.

It will be noted that the interference fringes in the photograph indicated in FIG. 6 contour the surface of the interferometer plate, so that the edge of the film appears as a discontinuity in all of the fringes of equal chromatic order. The total area of the interferometer plate appearing in the photograph is a rectangle 1.3 mm. x 0.0033 mm., so that the straightness and smoothness of the fringes indicates the excellent smoothness of the interferometer plates. By measuring the wavelength differences $\Delta\lambda$ between the two portions of the fringe, the film thickness may be obtained using the relations shown. For measuring the thicknesses of the aluminum oxide films, the wavelengths of the fringes were measured visually with a setting accuracy of approximately $\pm 1$ A. This setting uncertainty produced an uncertainty in the film thickness of the order of $\pm 5$ A. Since the thickness variations across the film surface were also of this order of magnitude, no attempt was made to use the more accurate but slower photographic method by which thicknesses may be determined with an accuracy of 1 or 2 A., as described in the second literature reference given hereinabove. The thickness of the thin, natural aluminum oxide film was obtained, as indicated at 15 in the flow sheet of FIG. 1, by subtracting the thickness of the deposited layer of aluminum oxide, determined by the interferometric measurements, from the total thickness of the composite natural aluminum oxide film and the deposited layer of aluminum oxide, determined by the capacitance measurements.

Figure 7:
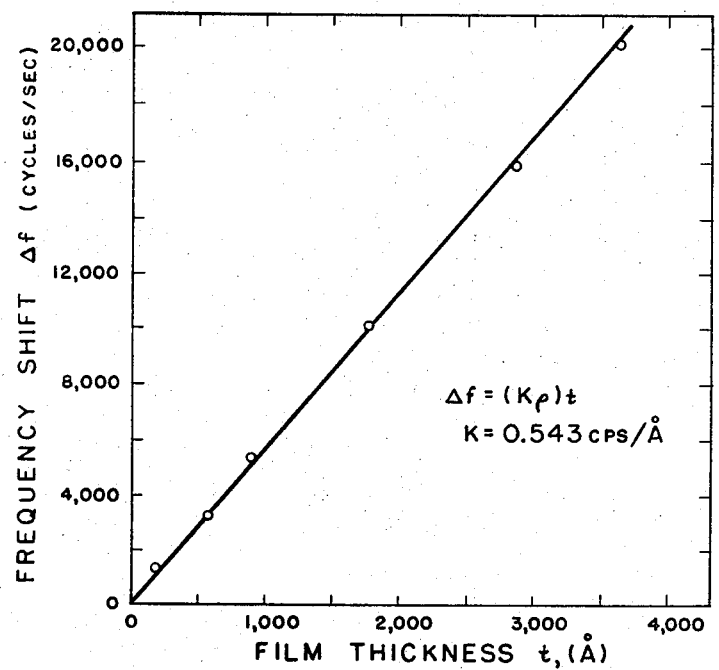
FIG. 7 is a graph showing interferometric film thickness plotted versus oscillator frequency.

The thickness of the film was monitored during deposition using a quartz oscillator thickness monitor, the output of which was fed to a counter. The oscillator was calibrated interferometrically for the different materials evaporated. A typical lot of interferometric film thickness versus oscillator frequency is shown in FIG. 7. The agreement between the interferometrically determined film thickness and that obtained from the oscillator frequency shift was sufficiently good that oscillator thicknesses were sometimes used instead of interferometric thicknesses.

Figure 8:
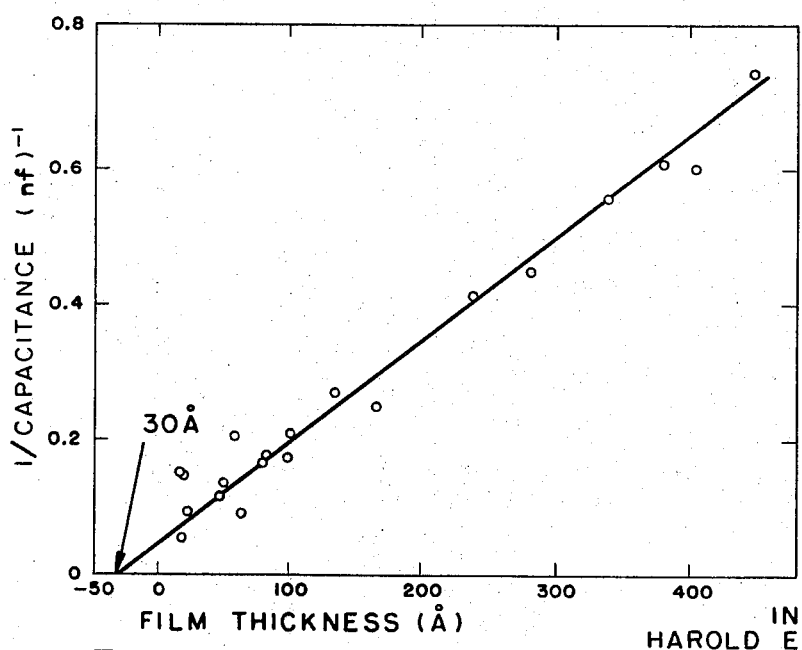
FIG. 8 is a graph showing the reciprocal of the measured capacitance plotted versus thickness of an added evaporated $Al_2O_3$ film.

It will now be shown how well the interferometric-capacitance method of the invention gives the thickness of a naturally-occurring oxide film on aluminum. FIG. 8 shows a graph of the reciprocal of the measured capacitance plotted versus thickness of an added evaporated $Al_2O_3$ film. In agreement with theory, this graph is indeed a straight line. The slope, which should be the dielectric constant of the $Al_2O_3$, is 7.6±0.3. This value is in good agreement with the value of approximately 8 which has been obtained for anodically formed $Al_2O_3$ films. The $x$ intercept should give the thickness of the naturally-occurring $Al_2O_3$ films, since it is presumed that the evaporated and naturally occurring films have the same dielectric constant. The value of 30 A. obtained for the $x$ intercept is in good agreement with estimates of the oxide film thickness on aluminum obtained using other techniques. It should be mentioned that this thickness represents the average thickness of $Al_2O_3$ which forms in air in about an hour on a freshly evaporated aluminum film. This thickness does not appear to be a very sensitive function of time; films exposed for only a few minutes to room air had about the same thicknesses as those exposed for several hours. Hence, the initial oxide film forms very rapidly, after which the growth is quite slow. Interferometric-capacitance measurements made by the use of the method of the invention also indicated additional growth of the oxide film after a week's time to be about 10 A., in good agreement with the ellipsometric results published in the literature.

It should be mentioned that, for a given accuracy of the capacitance measurement, the maximum sensitivity of the method is obtained when the thickness of the added evaporated film is the smallest. In this case C is the largest so that 1/C is the smallest, and the $x$ intercept is then most closely determined.

In the example given hereinabove, the naturally-occurring oxide film is the same material as the added evaporated dielectric film. However, this is not a necessary restriction. A two-layer dielectric film may be regarded as two capacitors in series. If the dielectric constant of the naturally-occurring oxide film is known, the thickness of that film may be obtained by determining the $x$ intercept as before, and multiplying that value by the ratio of the dielectric constants of the natural film and $Al_2O_3$.

The choice of $Al_2O_3$ for the added dielectric film is an important one since the requirements on this film are particularly severe. Many materials were tried: $PbF_2$, $CaF_2$, $SiO_2$, $MgF_2$, ZnS, SiO, and $Al_2O_3$, but of these $Al_2O_3$ evaporated using an electron gun proved to be the most pinhole-free and reproducible. Furthermore, capacitors made with $Al_2O_3$ showed only a 3% variation in capacitance for frequencies ranging from 0.2 to 20 kc. when aluminum was used as a base and overcoating material. The effect of possible Schottky barrier layers at the metal-dielectric interfaces is thus negligible, as would be expected since $Al_2O_3$ is very difficult to decompose and it shows virtually no semiconducting properties.

In addition to the choice of the proper dielectric film, the choice of the metal for the top electrode of the condenser is also critical. Gold, silver and aluminum were tried, and of these aluminum was the most successful. When silver or gold were used, shorts in the condensers frequently occurred. However, with aluminum, capacitors as thin as 21 A. of added $Al_2O_3$ film plus the thickness of the natural oxide film were formed without shorting. The advantages of using aluminum as a top electrode inevaporated capacitors also have been reported in the literature.

Although it has been demonstrated that the interferometric capacitance method of the invention can be used to determine the thickness of the naturally-occurring oxide film on aluminum, it will be understood that the method has general applicability for accurately determining the thickness of any naturally-occurring oxide or other film which forms on any metal substrate.

Obviously many modifications and variations of the present invention are possible in the light of the above teachings. It is therefore to be understood that within the scope of the appended claims the invention may be practiced otherwise than as specifically described.

What is claimed is:

1. A method for determining the thickness of a thin film having dielectric properties and attached to an electrical conductor which comprises the steps of:
   (a) depositing a layer having known dielectric properties upon the thin film having dielectric properties so that the resulting composite film comprising said thin film and said layer is sufficiently thick to be measured directly by the making of a capacitance measurement thereon;
   (b) depositing a layer of electrical conductor over the surface of said layer opposite to the surface deposited on said thin film;
   (c) making a capacitance measurement of said resulting composite film;
   (d) determining said thickness of the composite film from the capacitance measurement thereof; providing a further substantially identical layer having known dielectric properties;
   (e) making an interferometric measurement of said further layer having known dielectric properties;
   (f) determining the thickness of said further layer from the interferometric measurement thereof; and
   (g) determining the thickness of the thin film attached to said electrical conductor by substracting the determined thickness of said further layer from the determined thickness of said composite film.

2. A method according to claim 1, wherein the electrical conductor and layer of electrical conductor are a metal and the thin film having dielectric properties is a metal oxide film formed from the metal in air.

3. A method according to claim 1, wherein the electrical conductor and layer of electrical conductor are a semiconductor and the thin film having dielectric properties is an oxide film formed from the semiconductor in air.

4. A method according to claim 1, wherein the electrical conductor and layer of electrical conductor are aluminum metal, the thin film having dielectric properties is aluminum oxide film formed in an air atmosphere and the further having known dielectric properties is aluminum oxide.

5. A method according to claim 1, wherein the electrical conductor and layer of electrical conductor are a metal and the thin film having dielectric properties is a metal oxide film formed from the metal in air and having a thickness less than about 40 A.

6. A method according to claim 1, wherein the electrical conductor and layer of electrical conductor are a semiconductor and the thin film having dielectric properties is an oxide film formed from the semiconductor in air and having a thickness less than about 40 A.

7. A method according to claim 1, wherein the electrical conductor and layer of electrical conductor are aluminum metal, the thin film having dielectric properties is aluminum oxide film formed in an air atmosphere and having a thickness less than about 40 A. and the further layer having known dielectric properties is aluminum oxide.

References Cited

UNITED STATES PATENTS

| | | | |
|---|---|---|---|
| 2,518,647 | 8/1950 | Teeple et al. | 88—14 |
| 2,666,896 | 1/1954 | Harris | 324—61 |
| 2,824,281 | 2/1958 | Radnor | 324—61 |
| 3,243,701 | 3/1966 | Strand | 324—60 XR |
| 3,258,686 | 6/1966 | Selgin | 324—34 |

RUDOLPH V. ROLINEC, *Primary Examiner.*

E. E. KUBASIEWICZ, *Assistant Examiner.*

U.S. Cl. X.R.

88—14